(12) United States Patent
Dick et al.

(10) Patent No.: US 11,519,497 B2
(45) Date of Patent: Dec. 6, 2022

(54) LINEAR FORCE SOLENOID VALVE BODY MOUNTING

(71) Applicant: Allison Transmission, Inc., Indianapolis, IN (US)

(72) Inventors: Elizabeth P. Dick, Mooresville, IN (US); Doug S. Burchett, Martinsville, IN (US); James A. Raszkowski, Indianapolis, IN (US); William S. Reed, Greenfield, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 1035 days.

(21) Appl. No.: 16/211,375

(22) Filed: Dec. 6, 2018

(65) Prior Publication Data

US 2019/0178370 A1     Jun. 13, 2019

Related U.S. Application Data

(60) Provisional application No. 62/721,356, filed on Aug. 22, 2018, provisional application No. 62/596,515, filed on Dec. 8, 2017.

(51) Int. Cl.
*F16K 11/07* (2006.01)
*F16H 61/02* (2006.01)
(Continued)

(52) U.S. Cl.
CPC ..... *F16H 61/0251* (2013.01); *F16H 61/0009* (2013.01); *F16K 11/07* (2013.01);
(Continued)

(58) Field of Classification Search
CPC .... F16K 11/07; F16K 27/048; F16K 31/0613; F16H 61/0009; F16H 2061/0253
See application file for complete search history.

(56) References Cited

U.S. PATENT DOCUMENTS 4,133,510 A * 1/1979 Lorimor .............. F15B 13/0402
137/596.13
4,683,453 A * 7/1987 Vollmer ................ H01F 7/1607
335/278

(Continued)

FOREIGN PATENT DOCUMENTS

WO    WO-2017180429 A1 * 10/2017 ......... F16H 61/0009

*Primary Examiner* — Kelsey E Cary
(74) *Attorney, Agent, or Firm* — Faegre Drinker Biddle & Reath LLP

(57) ABSTRACT

Embodiments of the present disclosure provide a transmission spool valve/valve body arrangement facilitating the manufacturing of the valve body chambers accommodating the spool valves. Specifically, embodiments of the present disclosure provides a valve body having a common datum from which machining for each valve cavity formed through a particular face of a valve body can be referenced. In particular embodiments of the disclosure, a spring biases a solenoid assembly for each valve against a datum (common or otherwise). In more particular embodiments of the disclosure, the spring biases the solenoid assembly in a direction opposite to the direction of actuation of the spool valve upon actuation of the solenoid assembly. The spring bias positively displaces the solenoid assembly to the datum for precision location of the solenoid relative to the various hydraulic ports of the respective valve chamber. A variety of spring clip arrangements are provided to index the solenoid to the valve body.

35 Claims, 13 Drawing Sheets

(51) Int. Cl.
*F16H 61/00* (2006.01)
*F16K 31/06* (2006.01)
*F16K 27/00* (2006.01)
*F16K 27/04* (2006.01)

(52) U.S. Cl.
CPC .......... *F16K 27/003* (2013.01); *F16K 27/048* (2013.01); *F16K 31/0613* (2013.01); *F16H 2061/0253* (2013.01)

(56) References Cited

U.S. PATENT DOCUMENTS

| | | | |
|---|---|---|---|
| 6,412,392 B1* | 7/2002 | Gunter | F15B 13/0402 137/625.66 |
| 8,555,503 B2 | 10/2013 | Habel et al. | |
| 9,010,374 B2 | 4/2015 | Burkhart et al. | |
| 9,784,366 B2 | 10/2017 | Long et al. | |
| 2002/0134443 A1* | 9/2002 | Sudani | F16K 31/0613 137/625.65 |
| 2009/0140190 A1* | 6/2009 | Jinno | F16K 27/003 251/129.15 |
| 2013/0026401 A1* | 1/2013 | Burkhart | F16H 61/0251 251/129.15 |
| 2013/0333773 A1* | 12/2013 | Holmes | F15B 13/0435 137/487.5 |
| 2019/0203846 A1* | 7/2019 | Ishihara | F16K 31/0613 |

* cited by examiner

LINEAR FORCE SOLENOID VALVE BODY MOUNTING

CROSS-REFERENCE TO RELATED APPLICATIONS

This application claims the benefit of U.S. Provisional Application No. 62/596,515, filed Dec. 8, 2017, and U.S. Provisional Application No. 62/721,356, filed Aug. 22, 2018, the entire disclosure of both of which is hereby expressly incorporated herein by reference.

BACKGROUND OF THE DISCLOSURE

1. Field of the Disclosure

This disclosure relates generally to a control valve for controlling a transmission such as an automatic transmission and, more specifically, to mounting structures for mounting such a control valve to a valve body.

2. Description of the Related Art

Vehicle transmissions include control systems providing changes in gear ratio required during vehicle operation. Transmission control systems include electro-hydraulic systems regulating fluid pressure to control various components of the transmission. Certain of these configurations implement a spool valve operably positioned in a valve body. The valve body can be formed as an aluminum casting. A solenoid is utilized to control the position of the spool valve to control pressure communicated from the valve to, e.g., a clutch or brake, the engagement or disengagement of which impacts the gear ratio in which the transmission operates.

Linear force solenoids can be used to actuate the spool valve. With a number of spool valves positioned in a single automatic transmission valve body, operations to machine the associated spool valve cavities and conduits can be very extensive and time consuming. This is particularly true when each spool valve incorporates an individual datum, such that machining for each spool valve cavity references a different datum for every spool valve of the valve body.

Exhausting operating fluid from the valve chamber in which the spool valve reciprocates requires an exhaust port formed in the valve body that is in fluid communication with both the valve chamber and a transmission sump.

SUMMARY OF THE DISCLOSURE

The present disclosure, in one form thereof, provides a transmission spool valve arrangement facilitating the manufacturing of the valve body chambers accommodating the spool valves. Specifically, the present disclosure provides, in one embodiment thereof, a valve body having a common datum from which machining for each valve cavity formed through a particular face of a valve body can be referenced. In particular embodiments of the disclosure, a spring biases a solenoid assembly for each valve against the datum. In this document, "spring" is used in its normal sense to denote any elastic contrivance or body. In more particular embodiments of the disclosure, the spring biases the solenoid assembly in a direction opposite to the direction of actuation of the spool valve upon actuation of the solenoid assembly. The spring bias positively displaces the solenoid assembly to the datum for precision location of the solenoid assembly and; therefore, the solenoid assembly referencing spool relative to the various hydraulic ports of the respective valve chamber.

The present disclosure, in another form thereof, provides a spring clip that establishes solenoid position without obscuring a notch in the solenoid head so that the notch in the solenoid head can be utilized to exhaust operating fluid that gathers adjacent to the solenoid head to prevent pressure from building adjacent to the solenoid head.

In one form thereof, the present disclosure provides a multi-speed automatic transmission including: an input; an output; a plurality of gear sets, each one of the plurality of gear sets interposed between the input and the output and operable to set a gear ratio to establish a speed ratio between the input and the output; and an electro-hydraulic control operable to provide a hydraulic control to the multi-speed automatic transmission. In this form of the present disclosure, the electro-hydraulic control includes: a valve body, the valve body defining a chamber in fluid communication with a plurality of fluid ports, the plurality of fluid ports comprising an input port and an output port; a valve spool positioned in the chamber of the valve body and operable to reciprocate in the chamber to selectively control fluid communication between the input port and the output port to provide hydraulic control to the multi-speed automatic transmission; and a solenoid assembly including an armature positioned to actuate the valve spool when the solenoid is energized; a datum secured to the valve body; and a spring supplying a biasing force along a bias direction to bias the solenoid assembly toward the datum, the solenoid assembly spaced from the valve body along the bias direction and opposite the datum.

In another form thereof, the present disclosure provides a control valve for controlling a transmission, the control valve including: a valve body, the valve body defining a chamber in fluid communication with a plurality of fluid ports; a valve spool positioned in the chamber of the valve body and operable to reciprocate in the chamber to selectively regulate a flow of a working fluid through the fluid ports to control an operation of the transmission, the valve spool comprising a plurality of lands operable to regulate the flow of the working fluid through the ports; a solenoid assembly including an armature positioned to actuate the valve spool when the solenoid assembly is energized; a datum secured to the valve body, at least part of the solenoid assembly interposed between the datum and the valve body; and a spring biasing the solenoid assembly against the datum.

In a further form thereof, the present disclosure provides: a control valve for controlling a transmission, the control valve including: a valve body, the valve body defining a chamber in fluid communication with a plurality of fluid ports; a valve spool positioned in the chamber of the valve body and operable to reciprocate in the chamber to selectively regulate a flow of a working fluid through the fluid ports to control an operation of the transmission, the valve spool comprising a plurality of lands; and a solenoid assembly including an armature positioned to actuate the valve spool when the solenoid assembly is energized, the solenoid assembly including an end face facing the valve spool, the solenoid assembly secured relative to the valve body with the end face spaced a distance from the valve body.

In yet a further form thereof, the present disclosure provides a control valve for controlling a transmission, the control valve including: a valve body, the valve body defining a chamber in fluid communication with a plurality of fluid ports; a valve spool positioned in the chamber of the valve body and operable to reciprocate in the chamber to selectively regulate a flow of a working fluid through the fluid ports to control an operation of the transmission; a solenoid assembly including an armature positioned to actuate the valve spool when the solenoid assembly is energized, the valve spool maintaining a first position when the solenoid assembly is in an unenergized state, the armature moving the valve spool along an actuation direction from the first position to a second position when the solenoid assembly is energized; and a spring providing a biasing force biasing the solenoid assembly toward a datum, the biasing force acting in a direction opposite to the actuation direction to bias the solenoid assembly against the datum in the direction opposite to the actuation direction.

In an additional form thereof, the present disclosure provides a control valve for controlling a transmission, including: a valve body, the valve body defining a chamber in fluid communication with a plurality of fluid ports; a valve spool positioned in the chamber of the valve body and operable to reciprocate in the chamber to selectively regulate a flow of a working fluid through the fluid ports to control an operation of the transmission; and a solenoid assembly including an armature positioned to actuate the valve spool when the solenoid assembly is energized, the solenoid comprising a solenoid head having a distal rim with a notch in fluid communication with the chamber to provide for an exhaust flow out of the chamber of the valve body.

In an additional form thereof, the present disclosure provides a control valve for controlling a transmission, including: a valve body, the valve body defining a chamber in fluid communication with a plurality of fluid ports; a valve spool positioned in the chamber of the valve body and operable to reciprocate in the chamber to selectively regulate a flow of a working fluid through the fluid ports to control an operation of the transmission; and a solenoid assembly including an armature positioned to actuate the valve spool when the solenoid assembly is energized, the solenoid comprising a solenoid head having a distal rim with a notch in fluid communication with the chamber to provide for an exhaust flow out of the chamber of the valve body.

In an yet an additional form thereof, the present disclosure provides a control valve for controlling a transmission, including: a valve body, the valve body defining a chamber in fluid communication with a plurality of fluid ports, the valve body including a spring clip access; a valve spool positioned in the chamber of the valve body and operable to reciprocate in the chamber to selectively regulate a flow of a working fluid through the fluid ports to control an operation of the transmission, the valve spool comprising a plurality of lands; a solenoid assembly including an armature positioned to actuate the valve spool when the solenoid assembly is energized; and a spring clip, the spring clip access sized to receive the spring clip compressed between the solenoid and the valve body to index the solenoid assembly relative to the valve body.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION OF THE DRAWINGS

Figure 1:
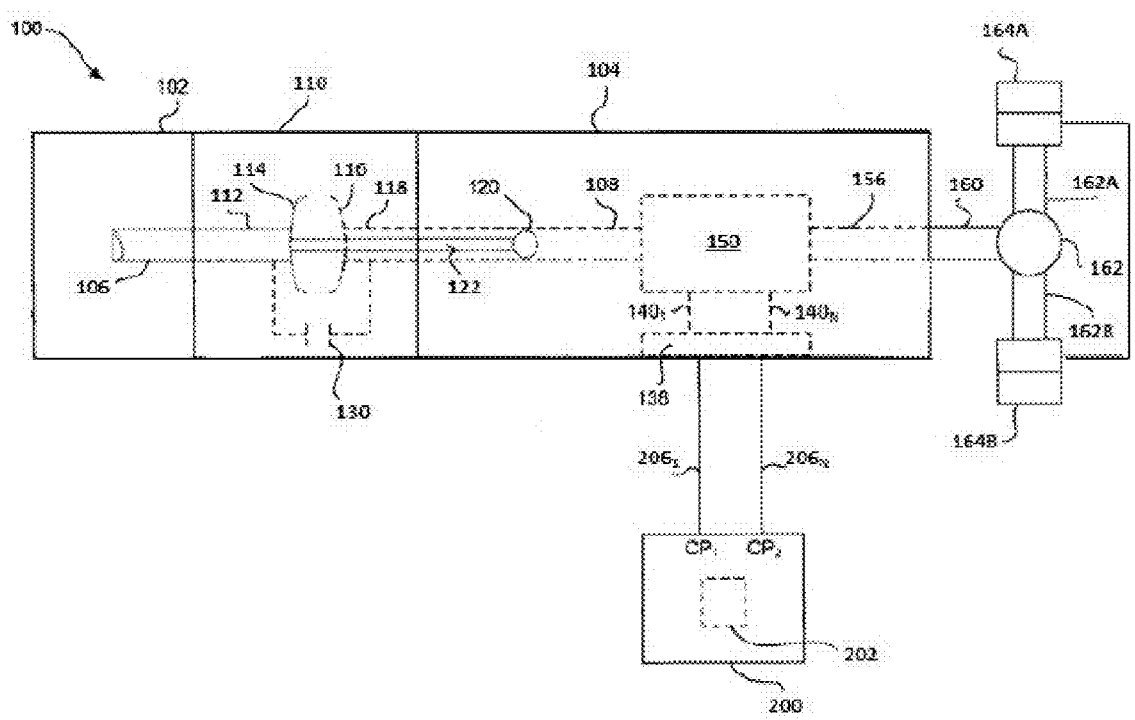
FIG. 1 illustrates a block diagram and schematic view of one illustrative embodiment of a powered vehicular system having a multi-speed automatic transmission controllable with a control valve of the present disclosure.

For the purposes of promoting an understanding of the principles of the present disclosure, reference is now made to the embodiments illustrated in the drawings, which are described below. The embodiments disclosed below are not intended to be exhaustive or limit the present disclosure to the precise forms disclosed in the following detailed description. Rather, the embodiments are chosen and described so that others skilled in the art may utilize their teachings. Therefore, no limitation of the scope of the present disclosure is thereby intended.

The control valve of the present disclosure can be utilized for controlling a transmission such as an automatic transmission. In the detailed description that follows, an exemplary automatic transmission for a vehicle will be described together with exemplary control valves of the present disclosure.

Referring now to FIG. 1, an exemplary schematic view of a vehicular system 100 is shown. The vehicular system 100 includes a prime mover 102 operatively coupled to a multi-speed automatic transmission 104. Exemplary prime movers include internal combustion engines, electric motors, hybrid power systems, and other suitable power systems.

Figure 2:
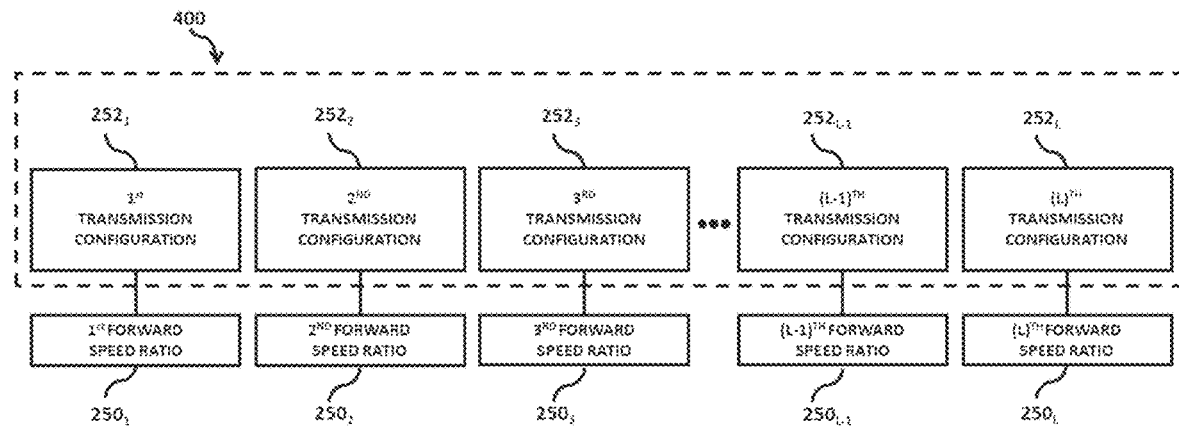
FIG. 2 illustrates a representative view of a plurality of forward speed ratios of the multi-speed automatic transmission of FIG. 1.

As used herein, the term multi-speed automatic transmission is defined as a transmission being configurable in a plurality of forward speed ratios of the output shaft to the input shaft wherein the configuration of the transmission is controlled through a transmission control circuit 200. As explained herein, transmission control circuit 200 includes a shift logic 400 which includes configuration settings $252_1$-$252_L$ (see FIG. 2), wherein L is a positive integer equal to 2 or greater, to configure the components of multi-speed automatic transmission 104 in respective forward speed ratios $250_1$-$250_L$. Multi-speed automatic transmissions may also include one or more reverse speed ratios. Exemplary multi-speed automatic transmissions include automatic transmissions and automated manual transmissions.

One exemplary automatic transmission includes a plurality of planetary gear sets having a plurality of selective couplers which are controlled by transmission control circuit 200 to configure the transmission in the various forward speed ratios. One exemplary automated manual transmission includes at least one gear carried by the input shaft, at least one gear carried by at least one countershaft, at least one gear carried by the output shaft, and a plurality of synchronizers or couplers that couple together various arrangements of the gears and/or shafts to achieve the plurality of forward speed ratios of the output shaft to the input shaft. Exemplary automated manual transmissions include both sliding mesh transmissions and constant mesh transmissions. Exemplary multi-speed automatic transmissions include both transmissions which continuously provide power from the input shaft to the output shaft during shifting and transmissions wherein power from the input shaft to the output shaft is interrupted during shifting.

Prime mover 102 includes an output shaft 106 that is operatively coupled to an input shaft 108 of multi-speed automatic transmission 104. In one embodiment, output shaft 106 of prime mover 102 is coupled to input shaft 108 of multi-speed automatic transmission 104 through a clutch (not shown). In the illustrated embodiment, prime mover 102 indirectly rotates input shaft 108 of multi-speed automatic transmission 104 through a torque converter 110. Output shaft 106 of prime mover 102 rotatably drives an input shaft 112 of torque converter 110. Input shaft 112 is fixedly coupled to an impeller or pump 114. Torque converter 110 further includes a turbine 116 that is coupled to a turbine shaft 118. A coupling fluid is provided in torque converter 110 such that a rotation of pump 114 causes through the fluid a corresponding rotation of turbine 116 and turbine shaft 118. Turbine shaft 118 is coupled to input shaft 108 of multi-speed automatic transmission 104.

In the illustrated embodiment, torque converter 110 includes a lockup clutch 130. Lockup clutch 130 is connected between pump 114 and turbine 116 of torque converter 110. Lockup clutch 130 provides a fixed coupling between pump 114 and turbine 116 when engaged and permits rotation of turbine 116 relative to pump 114 when disengaged. Generally, lockup clutch 130 is disengaged during certain operating conditions such as vehicle launch, low speed, and certain gear shifting conditions. Lockup clutch 130 is generally engaged at higher speeds or for certain gears of multi-speed automatic transmission 104. When engaged, lockup clutch 130 fixedly couples turbine shaft 118 to output shaft 106 of prime mover 102.

Multi-speed automatic transmission 104, in the illustrated embodiment, includes an internal pump 120 for building pressure within different fluid flow circuits (e.g., main circuit, lube circuit, etc.) of multi-speed automatic transmission 104. Pump 120 may be driven by a shaft 122 that is coupled to output shaft 106 of prime mover 102. Thus, prime mover 102 may rotate shaft 122 to drive internal pump 120 and build pressure within the various fluid flow circuits of multi-speed automatic transmission 104. Internal pump 120 may also regulate fluid pressure in torque converter 110. One such fluid flow circuit includes control valve 16 illustrated in FIGS. 4A and 4B, control valve 16a illustrated in FIGS. 5A and 5B, or control valve 16b illustrated in FIGS. 8A and 8B, each of which are further described below.

Figure 3:
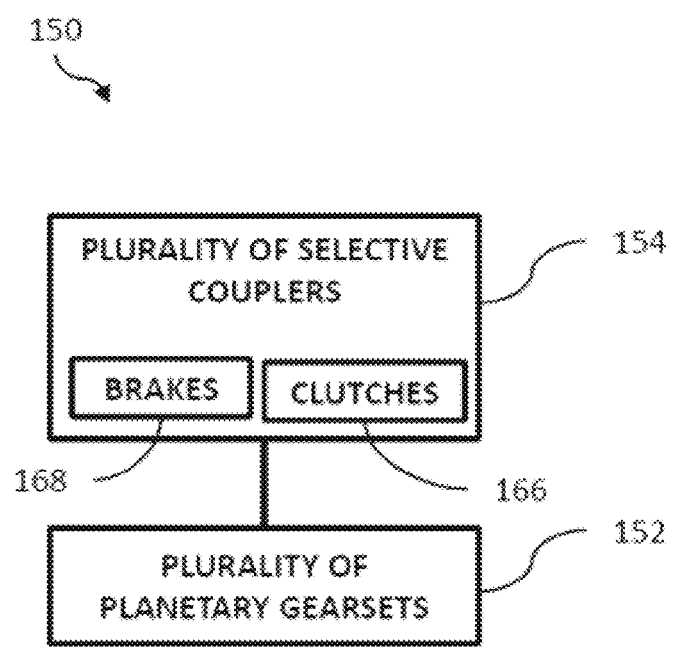
FIG. 3 illustrates a representative view of an exemplary planetary gear transmission of the powered vehicle system of FIG. 1 having a plurality of planetary gear sets and a plurality of selective couplers.

In the illustrated embodiment, multi-speed automatic transmission 104 includes a multi-speed planetary transmission 150. Referring to FIG. 3, multi-speed planetary transmission 150 includes a plurality of planetary gear sets 152 and a plurality of selective couplers 154 which are operatively coupled to the plurality of planetary gear sets 152. Each planetary gear set includes at least four components: a sun gear; a ring gear; a plurality of planet gears; and a carrier that is rotatably coupled to and carries the planet gears. In the case of a simple planetary gear set, the teeth of the sun gear are intermeshed with the teeth of the planet gears which are in turn engaged with the teeth of the ring gear. Each of these components may also be referred to as a gear set component. Each of the sun gear, the planet carrier, and the ring gear of a respective planetary gear set of the plurality of planetary gear sets 152 may be fixedly coupled to one or more of input shaft 108; an output shaft 156 of multi-speed planetary transmission 150; another one or more of the sun gear, the planet carrier, and the ring gear of one or more of the plurality of planetary gear sets; one or more of the selective couplers; a stationary member of the transmission, such as a housing; and combinations thereof.

It will be apparent to one of skill in the art that some planetary gear sets may include further components than those explicitly identified. For example, one or more of the planetary gear sets may include two sets of planet gears. A first set of planet gears may intermesh with the sun gear while the second set of planet gears intermesh with the first set of planet gears and the ring gear. Both sets of planet gears are carried by the planet carrier. Although multi-speed automatic transmission 104 is illustrated as multi-speed planetary transmission 150 in FIG. 3, multi-speed automatic transmission 104 may alternatively be structured in other arrangement to provide a plurality of forward speed ratios or gears. For example, transmission 104 may be made in accordance with U.S. Pat. No. 7,364,527, the entire disclosure of which is hereby explicitly incorporated by reference herein. A control valve 16 (see FIGS. 4A and 4B) of the present disclosure may also be utilized in the transmission and associated system disclosed in co-pending U.S. patent application Ser. No. 15/829,295, entitled SYSTEM AND METHOD FOR REPORTING ON VEHICLE CHARACTERISTICS DETERMINED BY TRANSMISSION CONTROL CIRCUIT, the entire disclosure of which is hereby expressly incorporated by reference herein.

As used herein, a selective coupler 154 is a device which may be actuated to fixedly couple two or more components together. A selective coupler 154 fixedly couples two or more components to rotate together as a unit when the selective coupler is in an engaged configuration. Further, the two or more components may be rotatable relative to each other when the selective coupler is in a disengaged configuration. The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

A first exemplary selective coupler is a clutch 166. A clutch 166 couples two or more rotating components to one another so that the two or more rotating components rotate together as a unit in an engaged configuration and permits relative rotation between the two or more rotating components in the disengaged position. Exemplary clutches may be shiftable friction-locked multi-disk clutches, shiftable form-locking claw or conical clutches, wet clutches, or any other known form of a clutch.

A second exemplary selective coupler is a brake 168. A brake 168 couples one or more rotatable components to a stationary component to hold the one or more rotatable components stationary relative to the stationary component in the engaged configuration and permits rotation of the one or more components relative to the stationary component in the disengaged configuration. Exemplary brakes may be configured as shiftable-friction-locked disk brakes, shiftable friction-locked band brakes, shiftable form-locking claw or conical brakes, or any other known form of a brake.

Selective couplers 154 may be actively controlled devices. Exemplary actively controlled devices include hydraulically actuated clutch or brake elements. Returning to FIG. 1, multi-speed automatic transmission 104 further includes an electro-hydraulic system 138 that is fluidly coupled to multi-speed planetary transmission 150 via a number, N, of fluid paths, $140_1$-$140_N$, where N may be any positive integer. In response to control signals $206_1$-$206_N$ from transmission control circuit 200, electro-hydraulic system 138 may operate control valve 16 (FIGS. 4A and 4B), control valve 16a (FIGS. 5A and 5B), or control valve 16b (FIGS. 8A AND 8B) to selectively cause fluid to flow through one or more of the fluid paths, $140_1$-$140_N$, to thereby control the engagement or disengagement of selective couplers 154 of multi-speed planetary transmission 150.

Figures 4A, 4B:
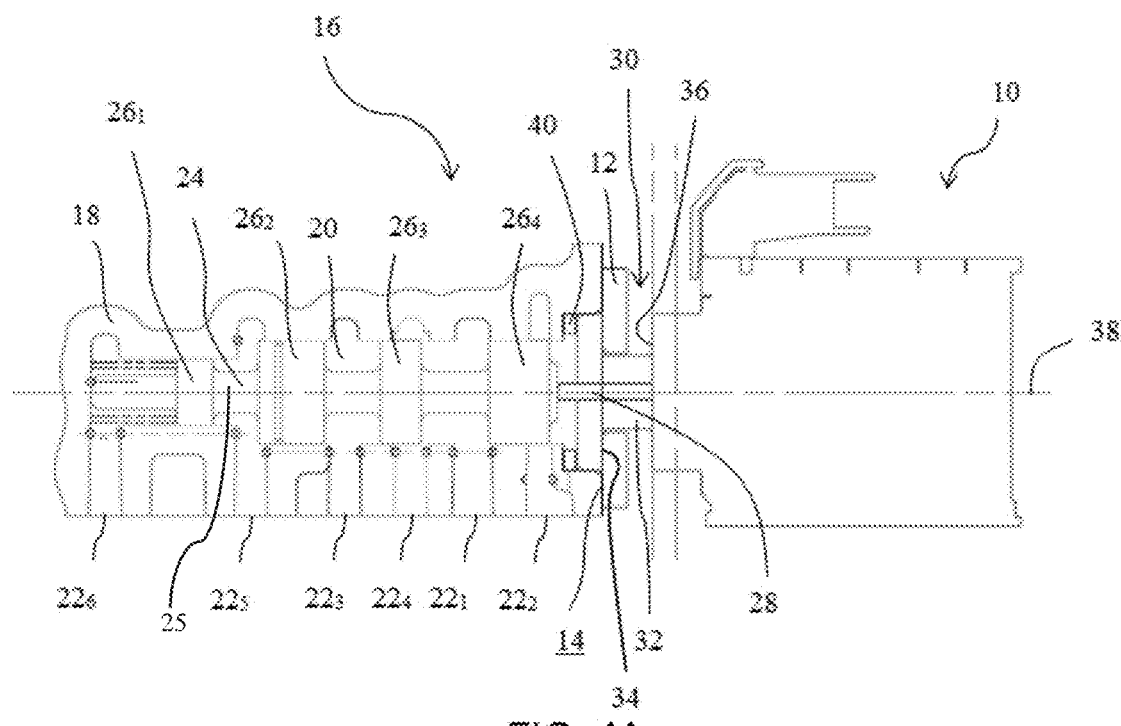
FIG. 4A is a partial schematic illustration of a cross-section of a valve body, a solenoid assembly and an associated valve spool, with the solenoid assembly energized to actuate the valve spool.
FIG. 4B is a partial schematic illustration of a cross-section of the valve body, solenoid assembly and associated valve spool of FIG. 4A, with the solenoid assembly in an unenergized state.

Referring to FIGS. 4A and 4B, control valve 16 includes valve body 18 in which chamber 20 and associated hydraulic fluid ports 22, illustratively hydraulic fluid ports $22_1$-$22_6$, are formed. Fluid ports 22 are further connected to hydraulic passages formed in valve body 18 to functionally connect these ports as described below. Valve body 18 can be formed of cast metal such as an aluminum alloy. Valve spool 24 is rotationally symmetrical and is sized for reciprocation within similarly rotationally symmetrical chamber 20. Valve spool 24 includes lands $26_1$-$26_4$ spaced along a central shaft 25 smaller in radial size than each of lands $26_1$-$26_4$. Lands $26_1$-$26_4$ are moveable within chamber 20 due to forces from hydraulic pressure within control valve 16 and due to energization of solenoid assembly 10. Lands $26_1$-$26_4$ are operable to selectively regulate a flow of a working fluid through fluid ports 22 to control an operation of transmission 150.

Figure 5A:
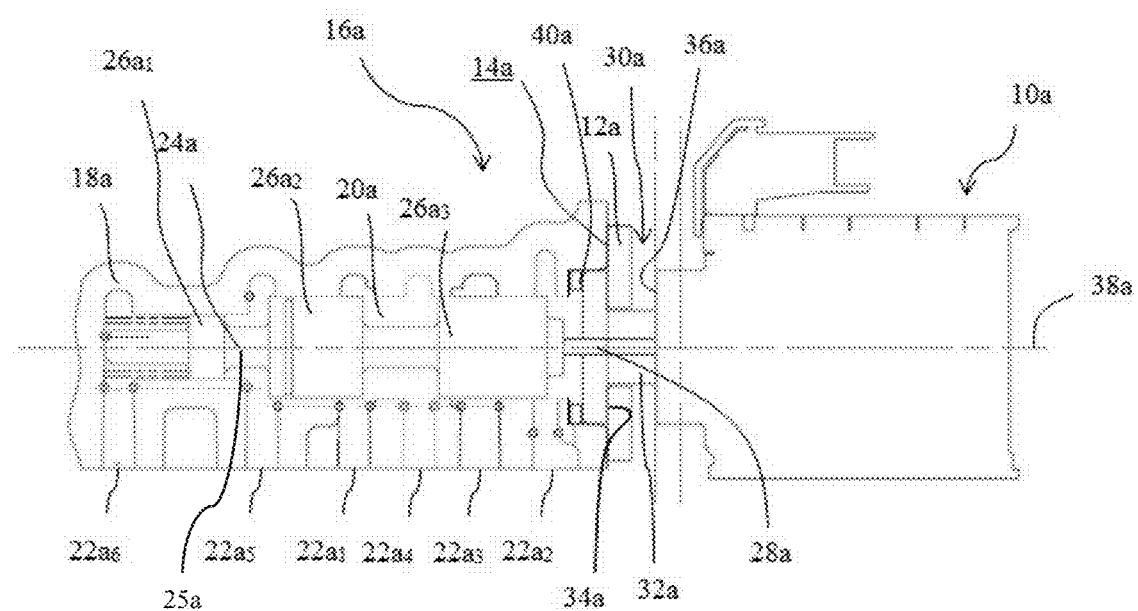
FIG. 5A is a partial schematic illustration of a cross-section of an alternative embodiment valve body and valve spool together with a solenoid assembly, with the solenoid assembly energized to actuate the valve spool.
Figure 5B:
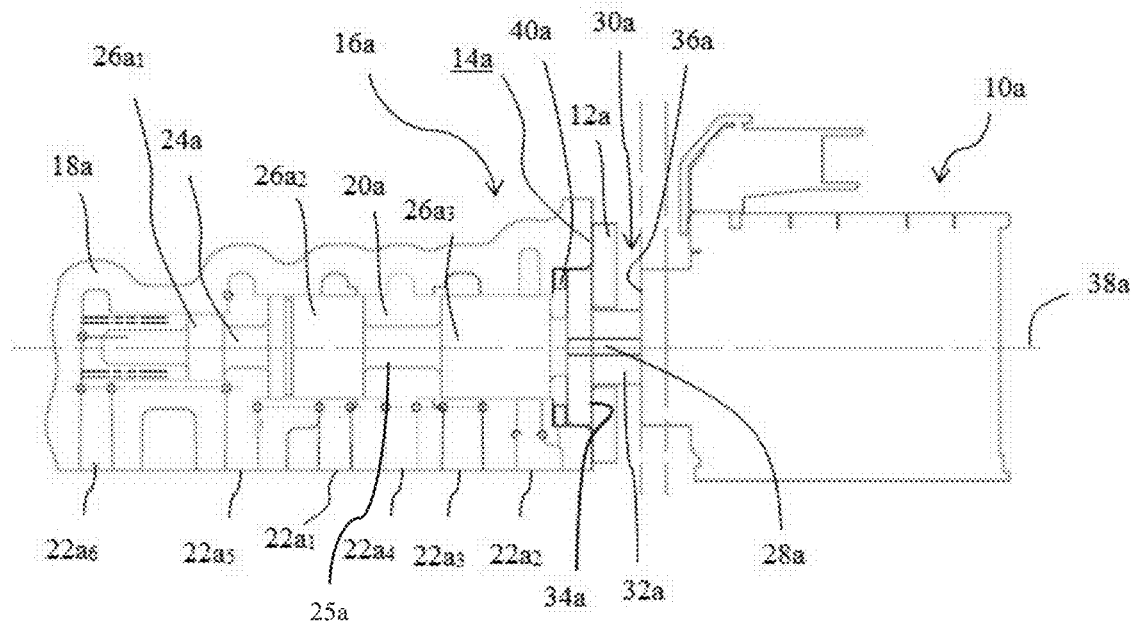
FIG. 5B is a partial schematic illustration of a cross-section of the valve body, solenoid assembly and associated valve spool of FIG. 5A, with the solenoid assembly in an unenergized state.
Figure 8A:
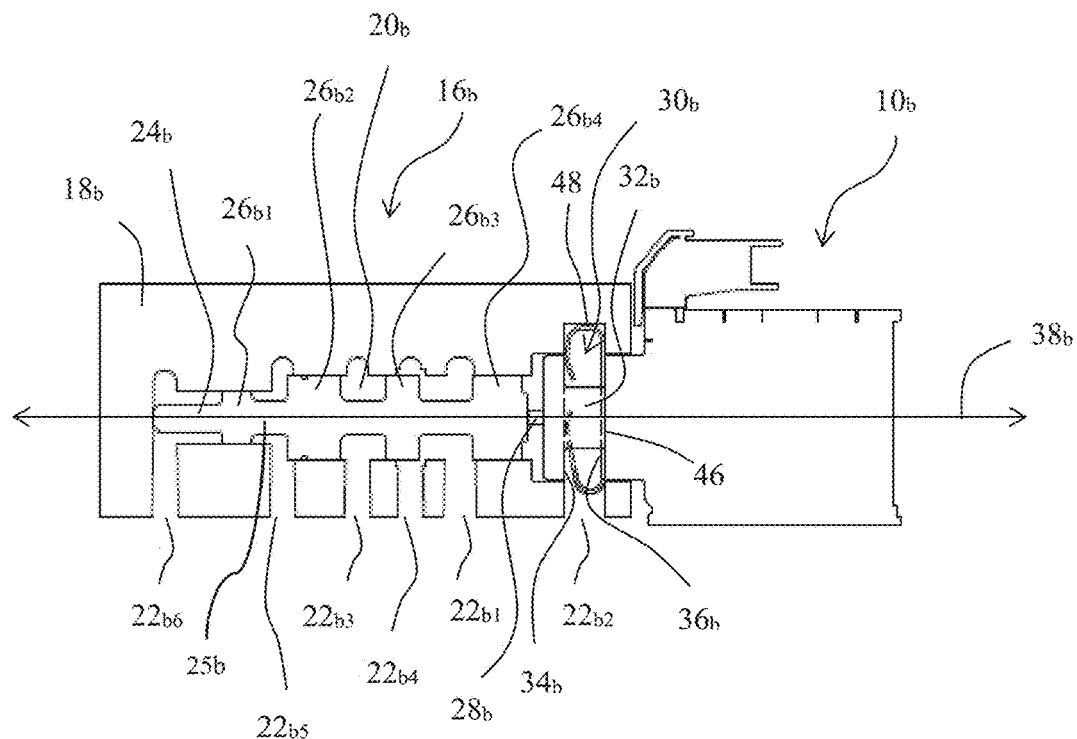
FIG. 8A is a partial schematic illustration of a cross-section of another alternative embodiment valve body and valve spool together with a solenoid assembly, with the solenoid assembly energized to actuate the valve spool.
Figure 8B:
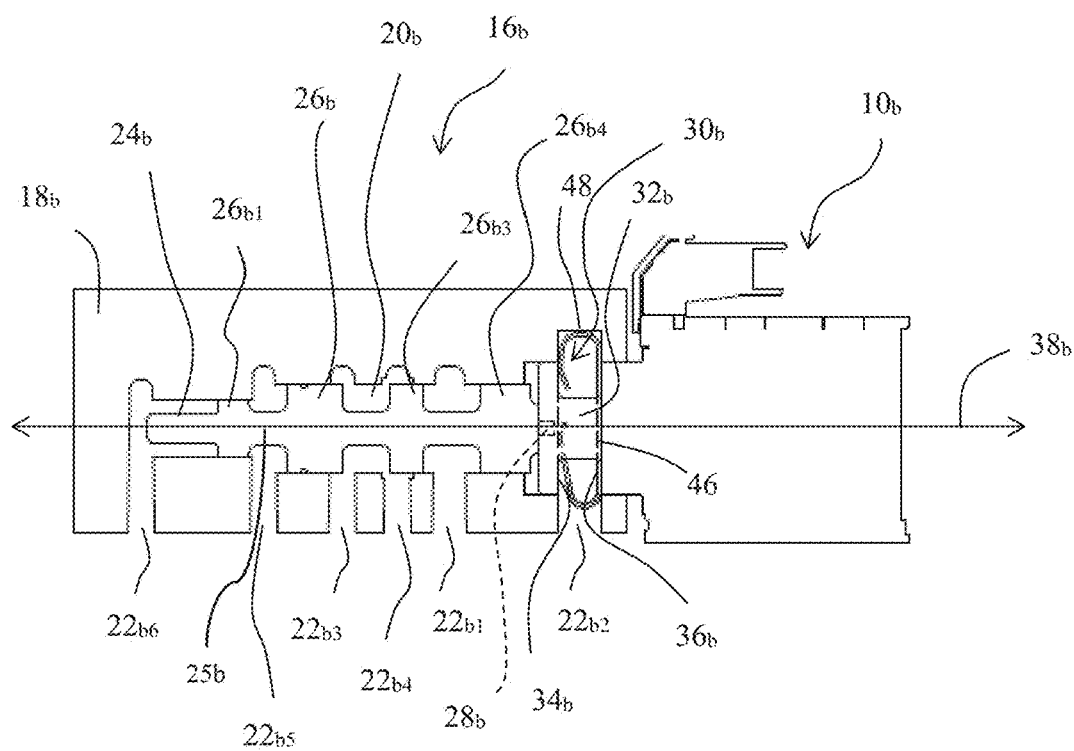
FIG. 8B is a partial schematic illustration of a cross-section of the valve body, solenoid assembly and associated valve spool of FIG. 9A, with the solenoid assembly in an unenergized state.

Solenoid assembly 10 includes an internal wound conductor capable of receiving a current, the flow of which through the wound conductor establishes a magnetic field within the conductor in the energized state of solenoid assembly 10. When solenoid assembly 10 is energized, the magnetic field within the wound conductor effects movement of armature 28. In the illustrated embodiments this movement is to the left. Specifically, FIGS. 4B, 5B, and 8B show solenoid assemblies 10, 10a, and 10b in the unenergized state, while FIGS. 4A, 5A, and 8A show solenoid assemblies 10, 10a, and 10b in the energized state, with armature 28 articulated to the left (versus the position shown in FIGS. 4B, 5B, and 8B) by the magnetic field generated within energized solenoid assemblies 10, 10a, and 10b. Movement of armature 28 is directed along longitudinal axis 38.

Control valve 16 is capable of fluid communication with each of fluid ports $22_1$-$22_6$, with each of fluid ports $22_1$-$22_6$ being selectively operable to direct fluid into or away from chamber 20. Generally, fluid ports $22_1$-$22_6$ are each operable to: provide working fluid to control operation of an element of transmission 104, such as selective couplers 154; receive working fluid to control operation of an element of transmission 104, such as selective couplers 154; or to provide a stabilizing force to valve spool 24 or another element of transmission 104, such as selective couplers 154. For the purposes of this document, "working fluid" is any hydraulic fluid used as a medium by which power is transferred in a hydraulic machine such as a hydraulic cylinder. In the exemplification shown in FIG. 4A, fluid port $22_1$ is a main/line pressure port providing input of working fluid to control valve 16. As previously indicated, such working fluid can be provided by pump 120 driven by prime mover 102. In alternative embodiments, working fluid can be provided to control valve 16 by an auxiliary pump driven by, e.g., an electric motor.

Fluid port $22_2$ is an exhaust port providing an output from control valve 16 to a transmission sump. In this way, exhaust fluid port $22_2$ allows fluid leaking to the cavity between land $26_4$ and solenoid assembly 10 to exhaust from control valve 16 so that pressure does not build adjacent to the head of solenoid assembly 10. In the exemplification of FIGS. 4A and 4B, control valve 16 controls a selective coupler 154 in the form of a clutch 166 operated by a hydraulic cylinder. Clutch fluid port $22_4$ is arranged to selectively supply clutch 166 with working fluid to actuate clutch 166 and thereby (at least in part) establish a desired gear ratio in transmission 150 to establish a desired speed ratio between input shaft 108 and output shaft 156 of transmission 150. Specifically, working fluid introduced into control valve 16 via main/line fluid port $22_1$ is directed through clutch fluid port $22_4$ when solenoid assembly 10 is energized and armature 28 contacts valve spool 24 and actuates valve spool 24 into the position illustrated in FIG. 4A. When solenoid assembly 10 is energized, fluid from clutch fluid port $22_4$ is directed to clutch 166 to actuate clutch 166. For example, fluid from clutch fluid port $22_4$ may travel along one of fluid paths 140 to pressurize a cylinder to actuate clutch 166. Additionally, fluid from clutch fluid port $22_4$ is directed to clutch feedback port $22_5$ when solenoid assembly 10 is energized. Pressure received from clutch feedback port $22_5$ when solenoid assembly 10 is energized acts on valve spool 24 to provide a counter force to armature 28 to regulate the maximum output of main/line pressure to clutch 166.

In the unenergized state of solenoid assembly 10 illustrated in FIG. 4B, exhaust backfill port $22_3$ provides a low pressure to clutch 166 to keep clutch 166 primed for actuation. Exhaust backfill port $22_3$ also provides an outlet for fluid from clutch 166 as solenoid assembly 10 transitions from the energized state of FIG. 4A to the unenergized state of FIG. 4B and clutch 166 deactuates. In the unenergized state of FIG. 4B, valve spool is positioned to allow fluid flow between clutch fluid port $22_4$ and exhaust backfill port $22_3$ via chamber 20.

Elevated exhaust port $22_6$ cooperates with pressure supplied to clutch feedback port $22_5$ when solenoid assembly 10 is energized to provide a counterforce to valve spool 24 relative to armature 28 to regulate the maximum output of main/line pressure to clutch 166 when solenoid assembly 10 is energized. In the unenergized state of solenoid assembly 10, elevated exhaust port $22_6$ receives pressure to actuate valve spool 24 to seal main/line pressure from clutch 166. In the unenergized state of solenoid assembly 10, pressure in control valve 16 forces valve spool 24 to the right until valve spool 24 bottoms out on an end face of solenoid assembly 10.

Control valve 16 illustrated in FIGS. 4A and 4B implements valve spool 24 with four lands 261-264. Control valve 16a illustrated in FIGS. 5A and 5B provides the same functionality as control valve 16, but with valve spool 24a incorporating only three lands $26a_1$-$26a_3$. Corresponding elements of control valves 16, 16a are indicated with the same reference numeral, with the alphabetic designator "a" added with respect to the elements of control valve 16a. Fluid ports $22a_1$-$22a_6$ of control valve 16a provide the same hydraulic flow to the same elements as described above with respect to fluid ports $22_1$-$22_6$ of control valve 16 described above. Similarly, the operation of fluid ports $22a_1$-$22a_6$ of control valve 16a is controlled by solenoid assembly 10a as described above with respect to fluid ports $22_1$-$22_6$ of control valve 16. Therefore, a detailed description of the hydraulic flow paths present with solenoid assembly 10a in the energized (FIG. 5A) and unenergized (FIG. 5B) states is not repeated here for the sake of brevity.

FIGS. 8A and 8B illustrate an alternative embodiment control valve 16b. Control valve 16b does not include plate 12, as seen in the embodiments of FIGS. 4A-6 and further described below. Instead of datum 14 (described in detail below) associated with plate 12, the embodiment of FIGS. 8A and 8B references solenoid assembly 10 to datum 46 of spring clip 48, as will be further described below. Control valve 16b otherwise shares a number of common elements with control valves 16, 16a described above. Corresponding elements of control valves 16, 16a and 16b are indicated with the same reference numeral, but with the alphabetic designator corresponding to the particular embodiment in question. These common elements have the same functionality described above, unless specifically noted. For example, fluid ports $22b_1$-$22b_6$ of control valve 16b provide the same hydraulic flow to the same elements as described above with respect to fluid ports $22_1$-$22_6$ of control valve 16.

Notably, exhaust port $22b_2$ is positioned between rims 34b, 36b of solenoid assembly 10b.

Figure 9:
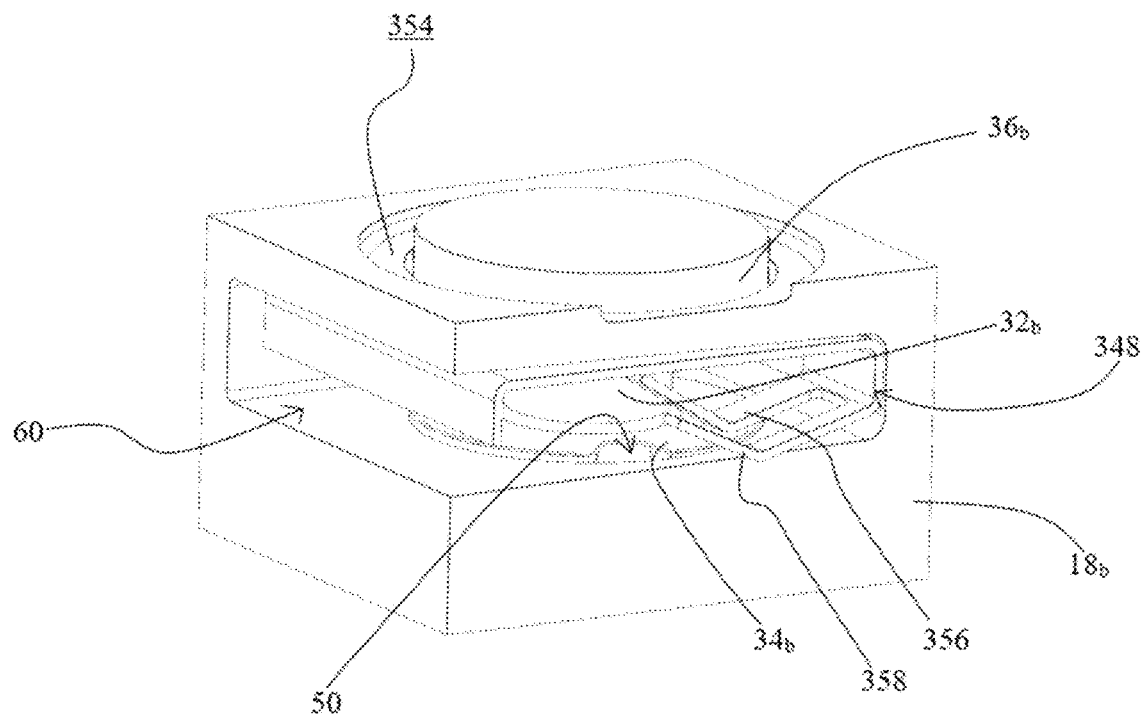
FIG. 9 is a partial perspective view of a solenoid assembly of the present disclosure positioned in a valve body with a spring clip.
Figure 10:
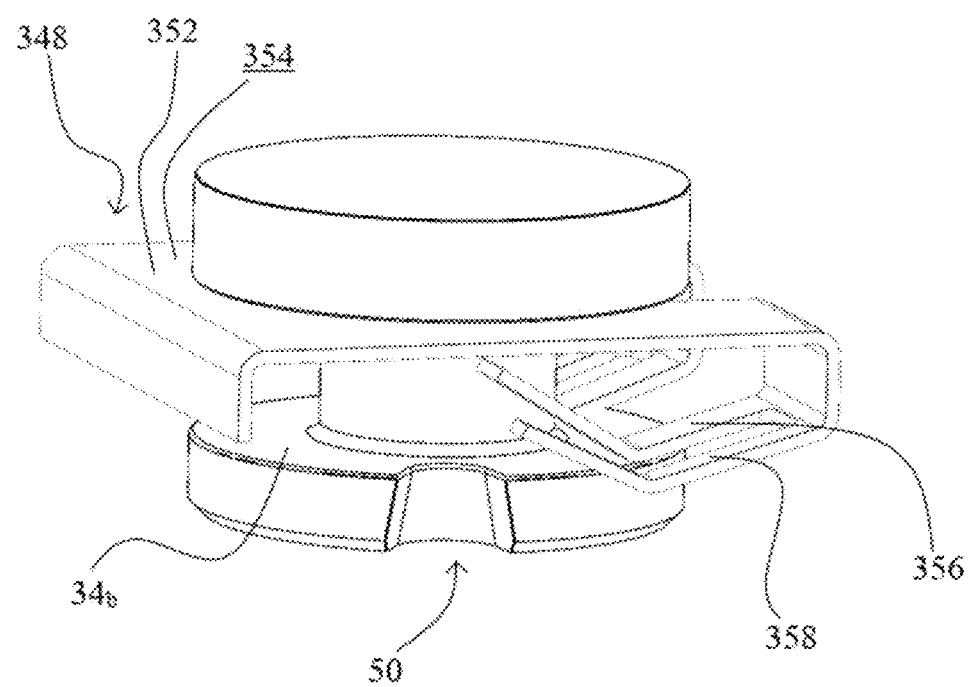
FIG. 10 is a partial perspective view of a solenoid and associated spring clip in accordance with an embodiment of the present disclosure.
Figure 15:
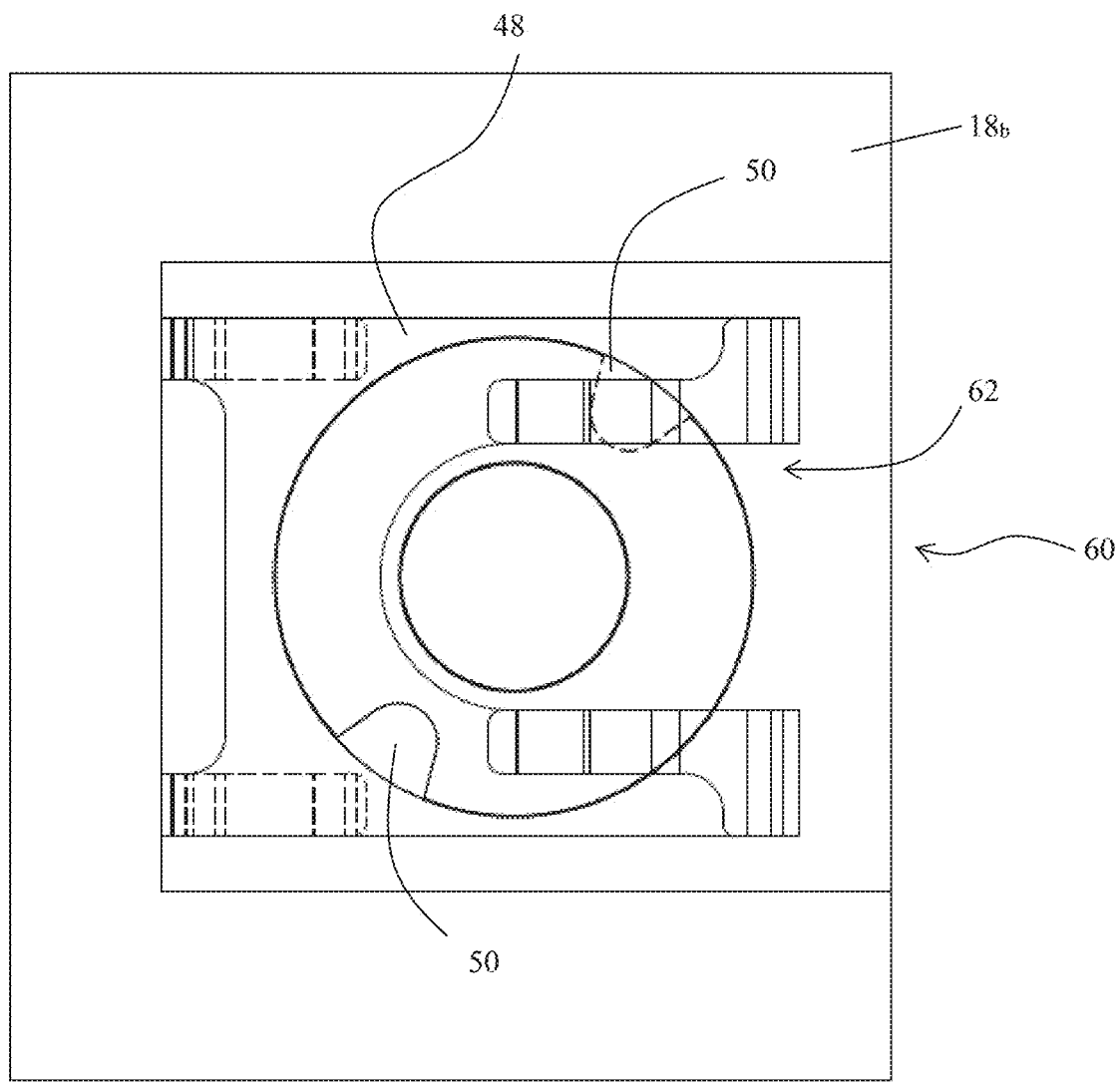
FIG. 15 is a partial, sectional view illustrating placement of a spring clip relative to a solenoid head and a valve body.
Figure 16A:
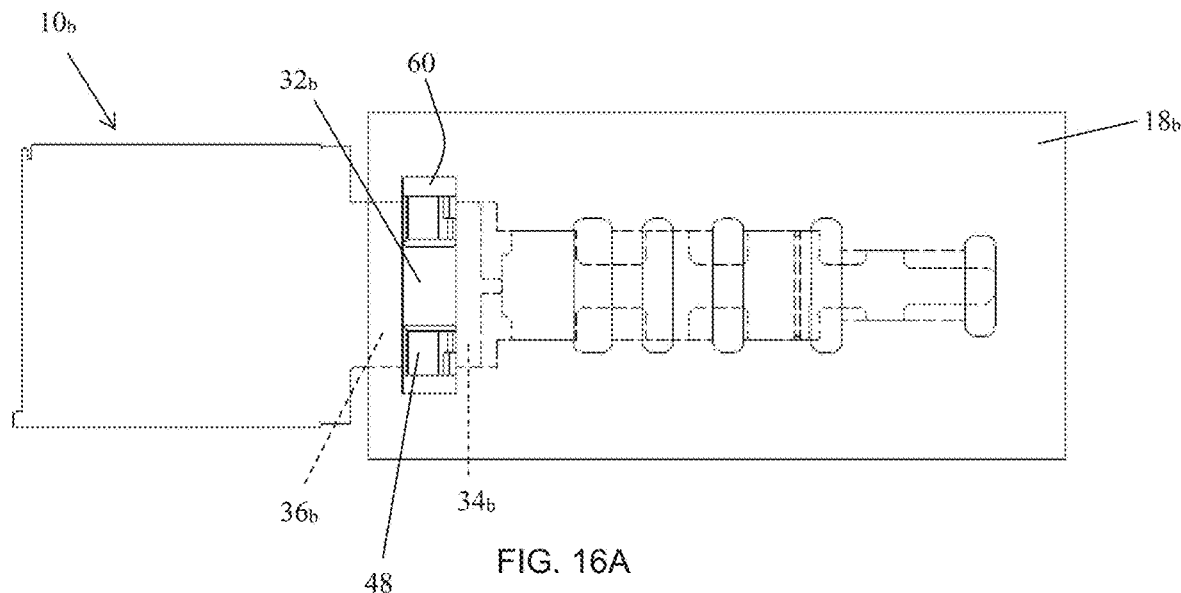
FIG. 16A is a partial schematic illustration of an alternative embodiment valve body and valve spool together with a solenoid assembly, with the solenoid assembly energized to actuate the valve spool.
Figure 16B:
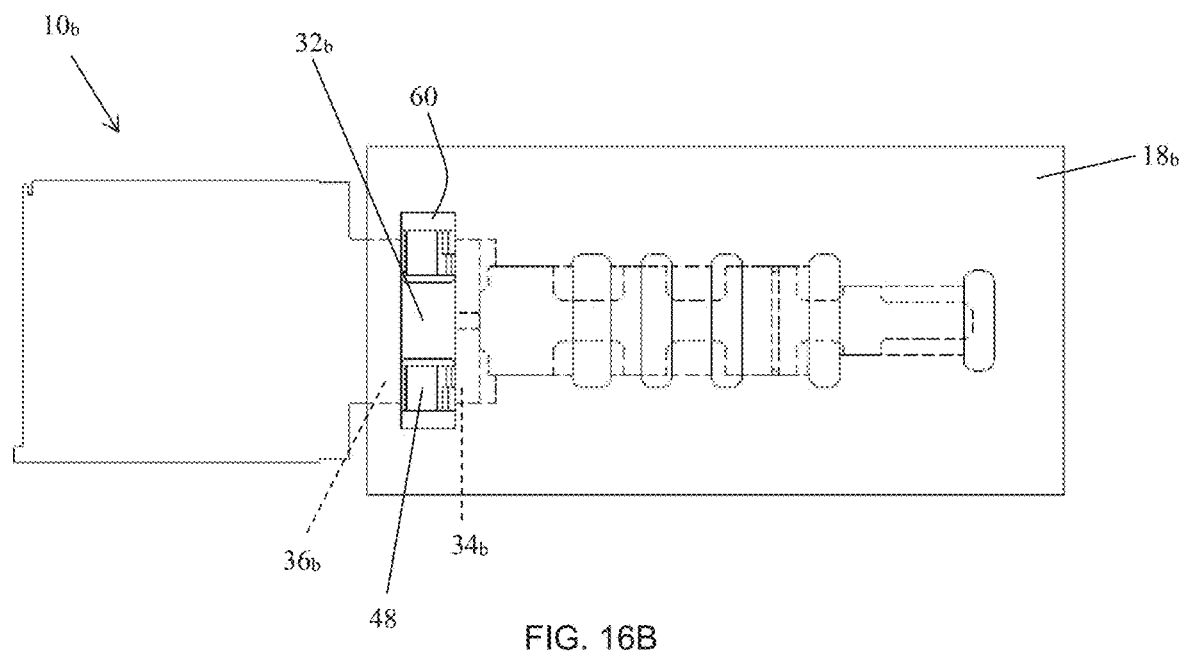
FIG. 16B is a partial schematic illustration of the valve body, solenoid assembly and associated valve spool of FIG. 16A, with the solenoid assembly in an unenergized state.

Exhaust port $22b_2$ functions in the same way as exhaust ports $22_2$ and $22a_2$ in that it allows fluid leaking past land $26b_4$ to exhaust from control valve 16b so that pressure does not build adjacent to head 30b of solenoid assembly 10b. However, exhaust port $22b_2$ is positioned between rims 34b, 36b of head 30b of solenoid assembly 10b, unlike the embodiments of FIGS. 4A-6. Unlike the embodiments of FIGS. 4A-6, rim 34b incorporates notch 50 (FIGS. 9, 10, and 15), allowing fluid flow from chamber 20b to pass rim 34b of head 30b of solenoid assembly 10b. This arrangement will be further described below.

In addition to coupling through selective couplers 154, various ones of the sun gears, the planet carriers, and the ring gears of the planetary gear sets 152 may be fixedly coupled together continuously throughout the operation of the disclosed transmissions. Components may be fixedly coupled together either permanently or removably. Components may be fixedly coupled together through spline connections, press fitting, fasteners, welding, machined or formed functional portions of a unitary piece, or other suitable methods of connecting components.

One or more rotating components, such as shafts, drums, and other components, may be collectively referred to as an interconnector when the one or more components are fixedly coupled together. Interconnectors may further be fixedly coupled to one or more gear set components of planetary gear sets 152 and/or one or more selective couplers 154.

Multi-speed planetary transmission 150 transfers torque from input shaft 108 to output shaft 156. Further, by selectively engaging various combinations of selective couplers 154, multi-speed planetary transmission 150 is able to vary a speed ratio of output shaft 156 relative to input shaft 108 for a plurality of forward gears or speed ratios (input shaft 108 and output shaft 156 both rotating in the same direction) and at least one reverse gear or speed ratio (input shaft 108 and output shaft 156 rotating in opposite directions). The changing or shifting between the various gears of multi-speed planetary transmission 150 is accomplished by selectively controlling the respective engagement and disengagement of selective couplers 154 via control of fluid pressure within the number of fluid paths $140_1$-$140_N$.

Output shaft 156 of multi-speed automatic transmission 104 is coupled to or integral with a drive shaft 160. Output shaft 156 drives a rotation of drive shaft 160. Drive shaft 160 is coupled to a rear drive unit 162, such as a differential. Rear drive unit 162 is coupled to, and rotatably drives, axle half shafts 162A and 162B which in turn drive wheels 164A and 164B.

Returning to FIG. 1, vehicular system 100 further includes a transmission control circuit 200. In the illustrated embodiment, transmission control circuit 200 is microprocessor-based and includes a non-transitory computer readable medium 202 which includes processing instructions stored therein that are executable by the microprocessor of transmission control circuit 200 to control operation of torque converter 110 and of multi-speed automatic transmission 104. A non-transitory computer-readable medium, or memory, may include random access memory (RAM), read-only memory (ROM), erasable programmable read-only memory (e.g., EPROM, EEPROM, or Flash memory), or any other tangible medium capable of storing information.

For example, transmission control circuit 200 may execute a shift criteria logic which provides control signals to electro-hydraulic system 138 over control lines $206_1$-

$206_N$ to achieve various configurations of multi-speed automatic transmission 104 which results in respective forward speed or gear ratios. In the case of multi-speed planetary transmission 150, the shift logic may selectively engage and disengage various ones of selective couplers 154 resulting in multi-speed planetary transmission 150 shifting between various gear or speed ratios of planetary gear sets 152. The term "logic" as used herein includes software and/or firmware executing on one or more programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. A non-transitory machine-readable medium comprising logic can additionally be considered to be embodied within any tangible form of a computer-readable carrier, such as solid-state memory, magnetic disk, and optical disk containing an appropriate set of computer instructions and data structures that would cause a processor to carry out the techniques described herein. This disclosure contemplates other embodiments in which transmission control circuit 200 is not microprocessor-based, but rather is configured to control operation of the torque converter 110 and/or multi-speed automatic transmission 104 based on one or more sets of hardwired instructions and/or software instructions stored in a memory unit. Further, transmission control circuit 200 may be contained within a single device or be a plurality of devices networked together to provide the functionality described herein.

Transmission control circuit 200 receives multiple inputs that may be used by shift criteria logic 400 to determine whether to shift between various gears of multi-speed automatic transmission 104, such as various gears of planetary gear sets 152 of multi-speed planetary transmission 150 in the illustrated embodiment. Referring to FIG. 1, vehicular system 100 includes a number of sensors associated with one of multi-speed automatic transmission 104 and torque converter 110 and configured to produce indications of one or more operating states of multi-speed automatic transmission 104 and torque converter 110, respectively. The sensors may either actively provide an indication by sending a sensor signal or passively provide an indication by making available a monitored characteristic, such as a voltage, a temperature, a pressure or other suitable characteristics. Sensors are one type of operational characteristic monitoring devices.

With reference to FIGS. 4A-7, securement of solenoid assemblies 10, 10a relative to valve body 18 will now be described. Prior art efforts to implement linear force solenoid assemblies in electro-hydraulic control systems for transmissions have implemented designs in which the solenoid references a datum formed in the valve body chamber in which the valve spool is positioned. With the prior art designs utilizing a valve specific datum, machining of the fluid ports associated with each valve chamber necessarily references a different datum for each valve implemented in a valve body. Improving over this prior art arrangement, the control valves of certain embodiments of the present disclosure allow for the use of a common datum for a plurality of control valves implemented in a single valve body. Specifically, plate 12 is bolted to valve body 18 (FIG. 7), with the surface of plate 12 facing valve body 18 functioning as datum 14 for each control valve 16 positioned through the face of valve body 18 to which plate 12 is secured.

Figure 6:
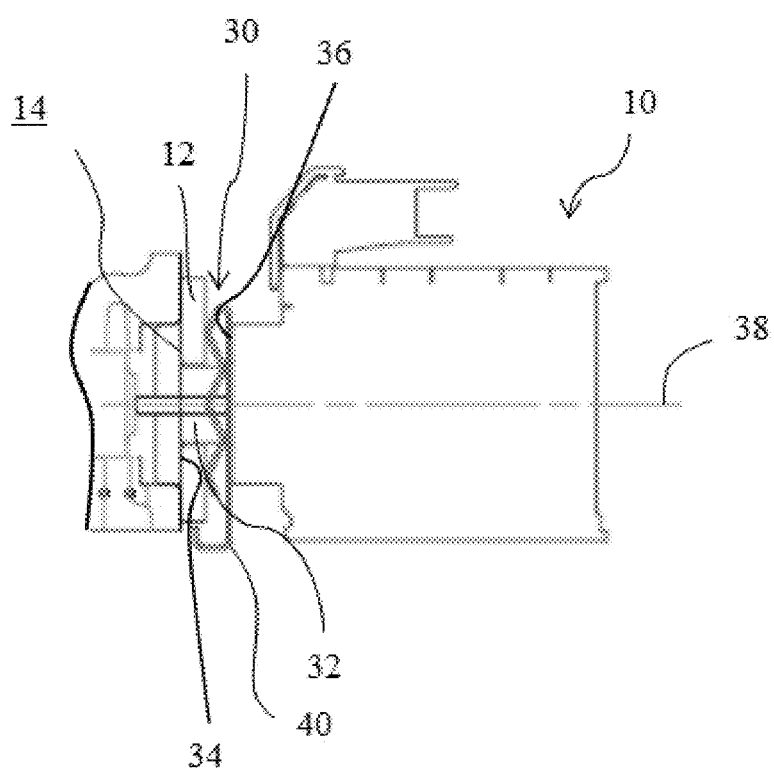
FIG. 6 is a partial schematic illustration of an alternative securement arrangement for a control valve of the present disclosure.
Figure 7:
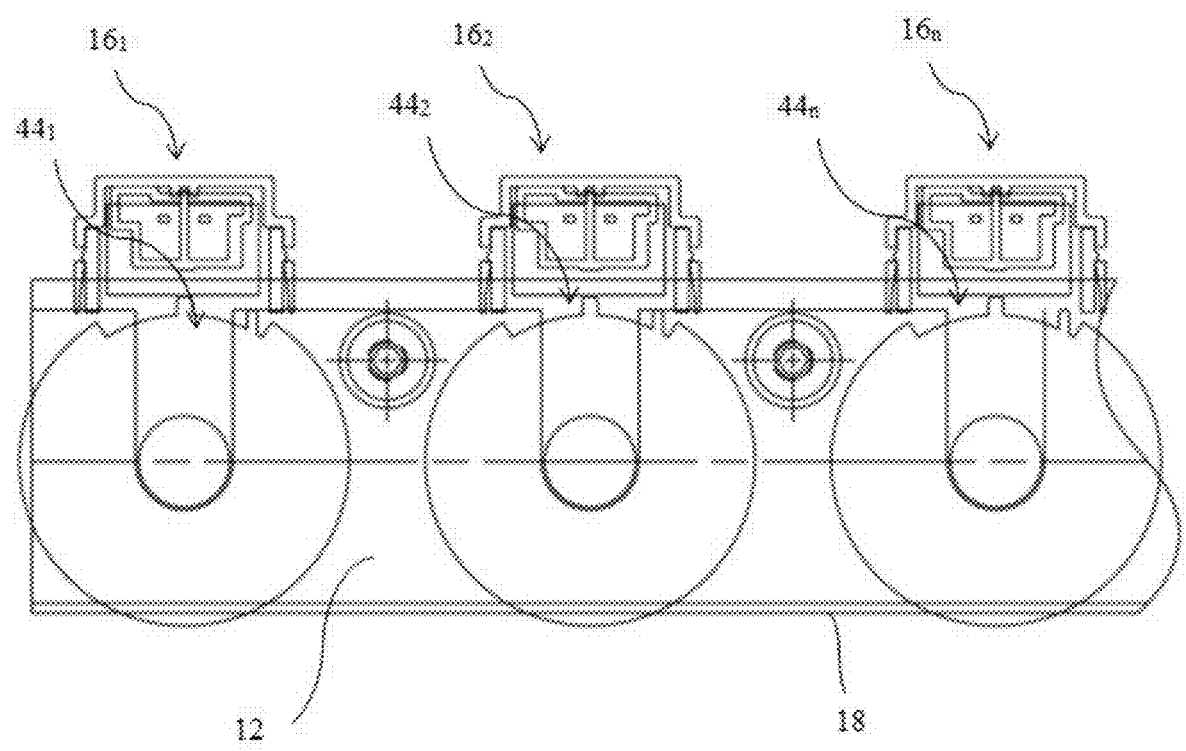
FIG. 7 is a partial schematic plan view of valve body in accordance with the present disclosure.

As illustrated in FIG. 7, plate 12 includes slots $44_1$-$44n$ corresponding in number to the number of control valves $16_1$-$16n$ positioned through the face of valve body 18 to which plate 12 is secured. Referring to FIGS. 4A-6, solenoid assemblies 10, 10a each include a head 30, 30a in the form of a spool. Throughout the remaining description of the securement of a solenoid assembly to a valve body in accordance with the present disclosure, reference will be made solely to the embodiment of FIGS. 4A, 4B, it being understood that the same structures and arrangement of such structures is implemented in the embodiment of FIGS. 5A, 5B, with like structures bearing the same reference numeral, with an alphabetic designator added to the reference numerals of the embodiment of FIGS. 5A, 5B.

At opposite ends of central shaft 32, rims 34, 36 extend radially beyond central shaft 32. Each slot 44 is sized to receive a central shaft 32. With a central shaft 32 positioned in a slot 44, axial movement of solenoid assembly 10 is stopped when rim 34 abuts plate 12 or when rim 36 abuts plate 12. In construction, head 30 of solenoid assembly 10 is positioned in the mouth of chamber 20 and then plate 12 is slid into position atop valve body 18 and bolted thereto. Because the gap between rims 34, 36 measured along longitudinal axis 38 is larger than the height of plate 12 along longitudinal axis 38 and solenoid assembly 10 does not reference a datum in valve body 18, without more, solenoid assembly 10 would be axially moveable relative to plate 12. To restrict such axial movement of solenoid assembly 10, a spring is utilized to bias solenoid assembly 10 against plate 12.

In the embodiments of FIGS. 4A-5B, wave spring 40 is interposed between an end face of head 30 of solenoid assembly 10 and a surface defined in chamber 20 and visible from the mouth of chamber 20. In construction, this is done before solenoid assembly is positioned in the mouth of chamber 20. Wave spring 40 spaces the end face of solenoid assembly 10 from the valve body and exerts a rightward directed force against head 30 of solenoid assembly 10 to index rim 34 of solenoid assembly 10 against datum 14 of plate 12. FIG. 6 illustrates an alternative arrangement absent wave spring 40. In the embodiment of FIG. 6, spring clip 42 is interposed between rim 36 and plate 12. Spring clip 42 exerts a rightward directed force against rim 36 of solenoid assembly 10 to index solenoid assembly 10 against datum 14 of plate 12. While FIG. 6 references elements of the embodiment illustrated in FIGS. 4A and 4B, wave spring 40 is equally useable with the embodiment of FIGS. 5A and 5B.

Both wave spring 40 and spring clip 42 provide a biasing force along longitudinal axis 38 to bias the solenoid assembly toward datum 14. If wave spring 40 is utilized, it spaces solenoid assembly 10 from the valve body along the bias direction such that the end face of solenoid assembly 10 opposite rim 34 is spaced from valve body 18. If spring clip 42 is utilized, it is not physically interposed between valve body 18 and solenoid assembly 10 to space solenoid assembly 10 from valve body 18; however, it effects such spacing nonetheless. Specifically, by biasing rim 34 against plate 12, solenoid assembly 10 is forced to the right, spacing the end face of solenoid assembly opposite datum 12 from valve body 18.

Referring to FIGS. 8A-16B, securement of solenoid assemblies 10b relative to valve body 18b will now be described. Unlike the embodiments of FIGS. 4A-7, plate 12 is absent from the embodiments of FIGS. 8A-16B. In the embodiments of FIGS. 8A-16B, spring clips 48, 348 provide datum 54, 354, respectively, against which each control valve 16b is referenced. Spring clips 48, 348 share a number of common elements. Such common elements are designated with the same reference numeral in the ones and tens column, but a different numeral in the hundreds column, e.g., datum 54 and datum 354. Unless specified otherwise, common structures of spring clips 48, 348 operate in the same fashion.

Figure 11:
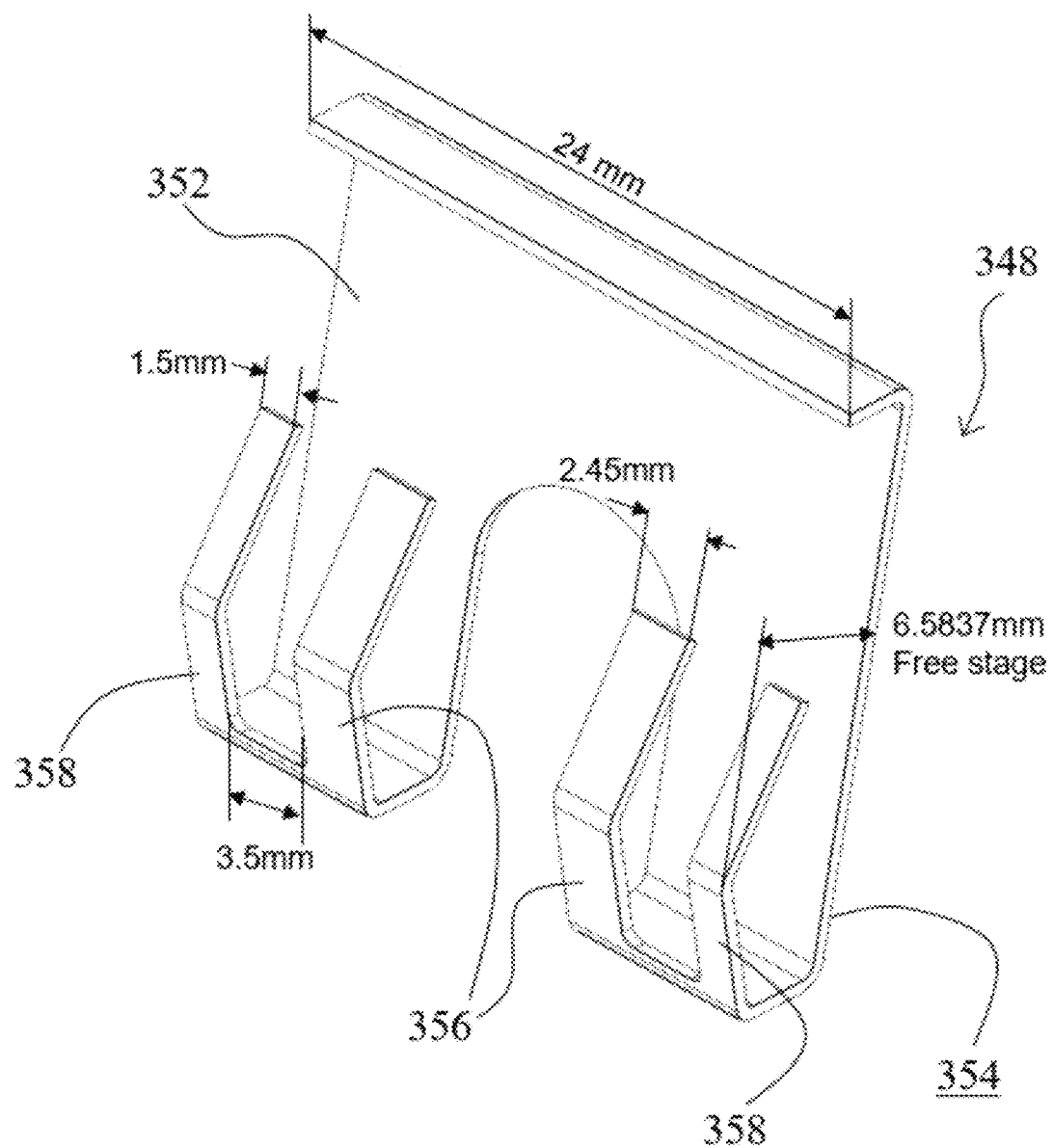
FIG. 11 is a perspective view of a spring clip in accordance with an embodiment of the present disclosure.
Figure 12:
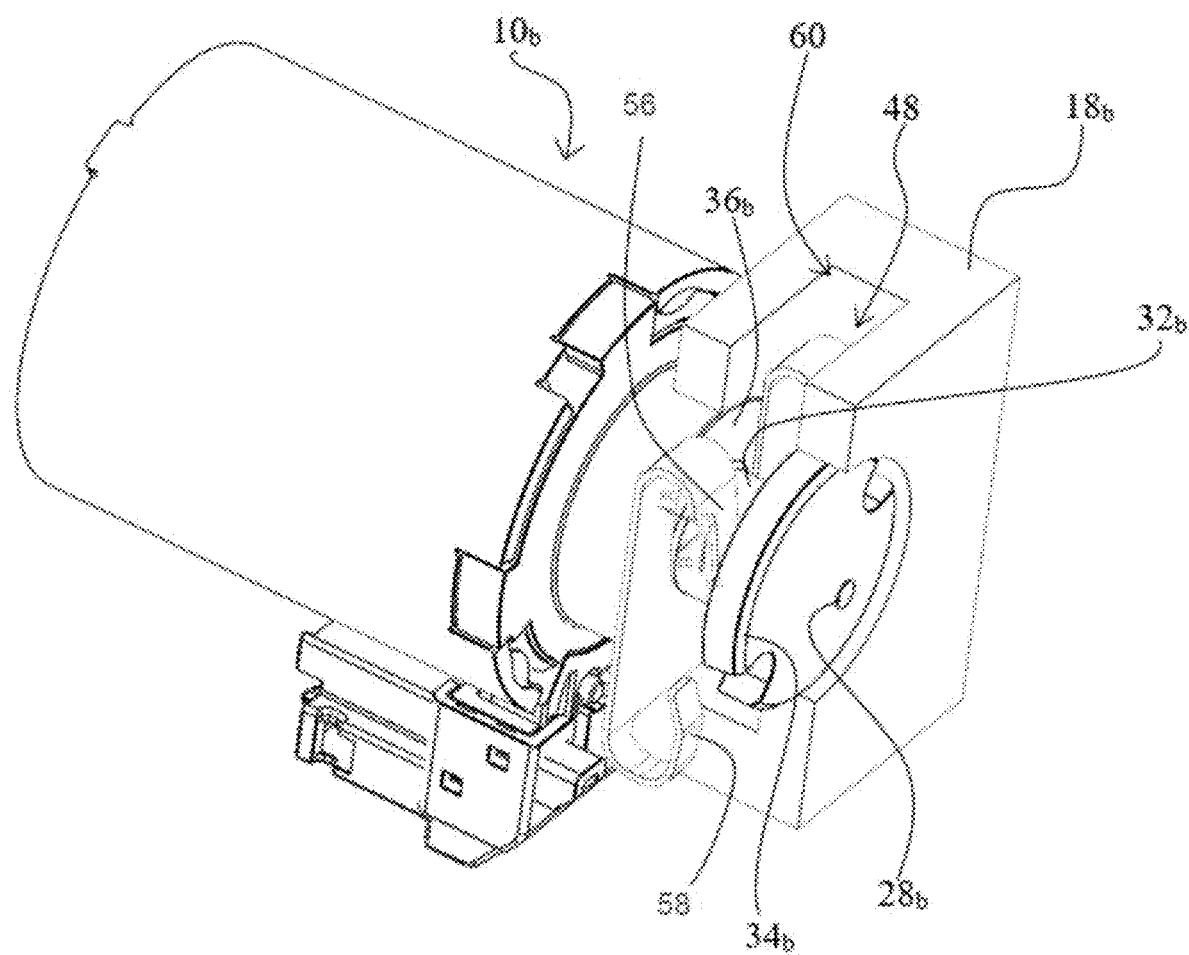
FIG. 12 is a partial perspective view of a solenoid assembly of the present disclosure positioned in a valve body with a spring clip, with only part of the valve body shown in section.
Figure 13:
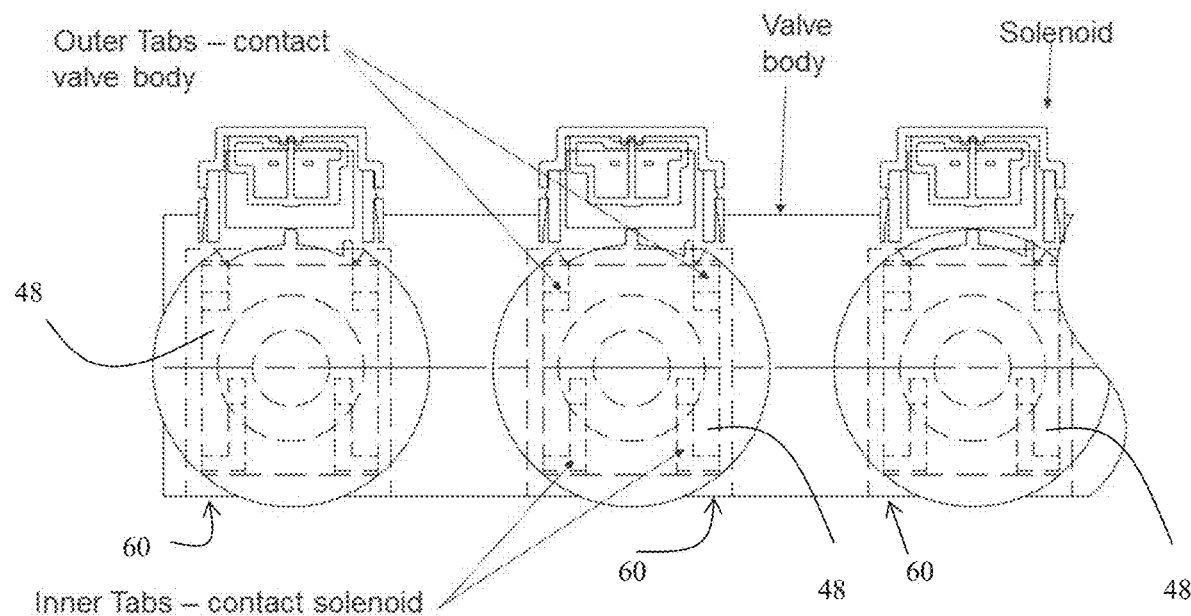
FIG. 13 is a partial schematic plan view of valve body in accordance with an embodiment of the present disclosure.
Figure 14A:
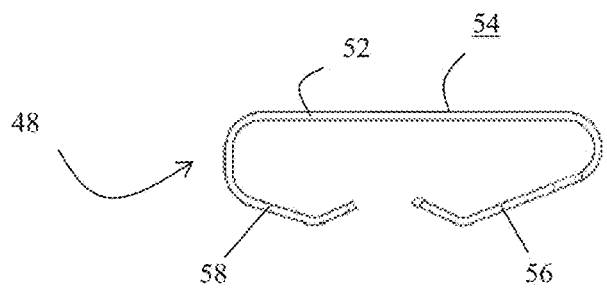
FIG. 14A is a side view of a spring clip in accordance with an embodiment of the present disclosure.
Figures 14B, 14C:
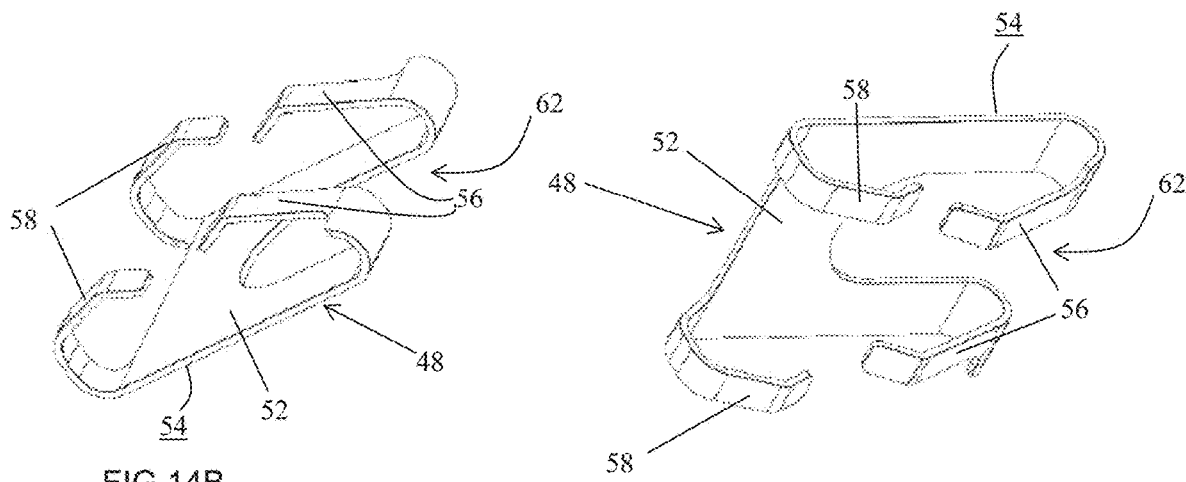
FIGS. 14B, and 14C are perspective views of the spring clip of FIG. 14A.

Referring to FIGS. 8A, 8B, and 12-16B, spring clip 48 includes main body 52, which defines datum 54. In construction, head 30b of solenoid assembly 10b (FIGS. 8A, 8B) is positioned in the mouth of chamber 20b and then spring clip 48 is slid into position through spring clip access 60. As shown in FIGS. 12, 13, and 15-16B, valve body 18b includes spring clip access 60 through which spring clip 48 can be positioned to hold solenoid assembly 10b in an operable position. Specifically, spring clip 48 is positioned between distal rim 34b and proximal rim 36b of solenoid head 30b, with central shaft 32b occupying central shaft slot 62 of spring clip 48. In this position, valve body spring arms 58 are compressed from their rest position toward main body 52 of spring clip 48. Specifically, datum 54 of spring clip 48 bears against a proximal surface defining spring clip access 60, while valve body spring arms 58 bear against a distal surface defining spring clip access 60. Because the height of spring clip access 60 is less than the height of spring clip 48, positioning spring clip 48 through spring clip access 60 compresses valve body spring arms 58 and forces datum 54 into engagement with the proximal surface defining spring clip access 60. As illustrated in FIG. 11, in one exemplary embodiment, the height of a spring clip is 6.5837 millimeters ("mm"). Each set of arms 356, 358 illustrated in FIG. 11 has the same geometry and dimensions. This exemplary clip can be utilized with a spring clip formed of access having a height of 6.0 mm, causing a nominal deflection of the valve body spring arms of 0.5837 mm. This embodiment is formed of CL 10355-LCM003 spring steel, Rc 47 minimum and provides an installed spring force of 55.5 newtons ("N") biasing the spring clip against the valve body. This arrangement produces a maximum stress in the spring clip of 1312 megapascals ("MPa"). In this exemplification, the spring force against the solenoid is 25-30 N.

With spring clip 48 positioned in spring clip access 60 as described above, and as illustrated in FIGS. 8A, 8B, and 12-16B, solenoid spring arms 56 are positioned to bear against distal rim 34b of solenoid assembly 10b. Solenoid spring arms 56 may be indexed to distal rim 34b of solenoid assembly 10b by the sizing of central shaft slot 62 relative to central shaft 32 or by the sizing of spring clip 48 relative to spring clip access 60. Generally, the geometry of spring clip 48 indexes solenoid springs arms 56 to bear against distal rim 34b of solenoid assembly 10b when spring clip 48 is operably positioned in spring clip access 60.

In the installed position of spring clip 48 described above, solenoid spring arms 56 are positioned to allow free flow of operating fluid through notches 50 (FIG. 15) formed in distal rim 34b to allow exhaust flow from control valve 16b, as described above. As shown in FIGS. 8A, 8B, 16A, and 16B, spring clip 48 spaces the end face of solenoid assembly 10b from the valve body and supplies a proximal to distal force along longitudinal axis 38b against distal rim 34b to bias proximal rim 36b against datum 54 of spring clip 48. To ensure that notches 50 are not positioned under the distal most aspect of solenoid spring arms 56, solenoid assembly 10b can be rotationally indexed with respect to valve body 18b.

Spring clip 348 functions in the same way and as spring clip 48 described above. Notably, solenoid spring arms 356 and valve body spring arms 358 of spring clip 348 project from the same side of spring clip 348, while solenoid spring arms 56 and valve body spring arms 58 of spring clip 48 project from opposing sides of spring clip 48. In use, however, spring clips 48 and 348 provide the same functionality and are assembled in the same manner. Therefore, a full description of spring clip 348 is not provide for the sake of brevity, it being understood that elements bearing the same references numerals in the ones and tens column between spring clips 48 and 348 provide the same functionality.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A multi-speed automatic transmission, comprising:
   an input;
   an output;
   a plurality of gear sets, each one of said plurality of gear sets interposed between said input and said output and operable to set a gear ratio to establish a speed ratio between said input and said output; and
   an electro-hydraulic control operable to provide a hydraulic control to the multi-speed automatic transmission, said electro-hydraulic control comprising:
      a valve body, said valve body defining a chamber in fluid communication with a plurality of fluid ports, said plurality of fluid ports comprising an input port and an output port;
      a valve spool positioned in said chamber of said valve body and operable to reciprocate in said chamber to selectively control fluid communication between said input port and said output port to provide hydraulic control to said multi-speed automatic transmission; and
      a solenoid assembly including an armature positioned to actuate said valve spool when the solenoid assembly is energized;
      a datum secured to said valve body, said datum comprising a base of a spring clip; and
      a spring supplying a biasing force along a bias direction to bias said solenoid assembly toward said datum, said spring comprising a first resilient arm and a second resilient arm of said spring clip, said first resilient arm and said second resilient arm extending from said base of said spring clip.

2. The multi-speed automatic transmission of claim 1, wherein said valve body further defines a second chamber in fluid communication with a second plurality of fluid ports, said second plurality of fluid ports comprising a second input port and a second output port, said electro-hydraulic control further comprising:
   a second valve spool positioned in said second chamber to selectively control fluid communication between said second input port and said output port to provide hydraulic control to said multi-speed automatic transmission;
   a second solenoid assembly including a second armature positioned to actuate said second valve spool when the second solenoid is energized.

3. The multi-speed automatic transmission of claim 1, wherein said first resilient arm supplying a first biasing force to said solenoid assembly and said second resilient arm supplying a second biasing force to said valve body.

4. The multi-speed automatic transmission of claim 1, wherein said spring is interposed between said solenoid assembly and said valve body.

5. The multi-speed automatic transmission of claim 1, wherein said spring is interposed between said datum and said solenoid assembly.

6. The multi-speed automatic transmission of claim 1, wherein said solenoid assembly comprises an end face, said valve spool bottoming out on said end face when said solenoid assembly is not energized, said solenoid assembly secured relative to said valve body with said end face spaced a distance from said valve body.

7. A control valve for controlling a transmission, comprising:
a valve body, said valve body defining a chamber in fluid communication with a plurality of fluid ports;
a valve spool positioned in said chamber of said valve body and operable to reciprocate in said chamber to selectively regulate a flow of a working fluid through said fluid ports to control an operation of the transmission, said valve spool comprising a plurality of lands operable to regulate said flow of said working fluid through said ports;
a solenoid assembly including an armature positioned to actuate said valve spool when the solenoid assembly is energized;
a datum secured to said valve body, at least part of said solenoid assembly interposed, in an axial direction, between said datum and said valve body; and
a spring biasing said solenoid assembly against said datum, in the axial direction.

8. The control valve of claim 7, wherein said spring comprises a first solenoid spring arm of a solenoid clip, said datum comprising a surface of a main body of said solenoid clip, said first solenoid spring arm extending from said main body.

9. The control valve of claim 8, wherein said spring further comprises a first valve body spring arm extending from said main body of said solenoid clip, said first valve body spring arm biasing said surface of said solenoid clip toward said valve body.

10. The control valve of claim 8, wherein said spring further comprises a second solenoid spring arm extending from said main body, said second solenoid spring arm and said first solenoid spring arm cooperating to bias said solenoid assembly toward said datum.

11. The control valve of claim 10, wherein said solenoid clip further comprises a first valve body spring arm extending from said main body and a second valve body spring arm extending from said main body, said first valve body spring arm and said second valve body spring arm cooperating to bias said surface of said solenoid clip defining said datum toward said valve body.

12. The control valve of claim 11, wherein said solenoid assembly comprises a solenoid head from which said armature extends when said solenoid is energized, said solenoid head comprising a central shaft spanning a distal solenoid head rim and a proximal solenoid head rim, said first solenoid spring arm and said second solenoid spring arm cooperating to bias said proximal solenoid head rim toward said datum, said central shaft of said solenoid head interposed between said first solenoid spring arm and said second solenoid spring arm, said first solenoid spring arm and said second solenoid spring arm providing a biasing force to said distal solenoid head rim.

13. The control valve of claim 7, wherein said solenoid assembly comprises a solenoid head positioned in said chamber of said valve body, said solenoid head shaped to allow an exhaust flow of the working fluid to flow from the chamber of the valve body past said solenoid head.

14. The control valve of claim 13, wherein said solenoid head comprises a notch in fluid communication with the chamber of the valve body, the notch allowing the exhaust flow of the working fluid to flow from the chamber of the valve body past said solenoid head, the datum spaced from the notch, whereby said datum does not restrict the exhaust flow through the notch.

15. A control valve for controlling a transmission, comprising:
a valve body, said valve body defining a chamber in fluid communication with a plurality of fluid ports;
a valve spool positioned in said chamber of said valve body and operable to reciprocate in said chamber to selectively regulate a flow of a working fluid through said fluid ports to control an operation of the transmission, said valve spool comprising a plurality of lands; and
a solenoid assembly including an armature positioned to actuate said valve spool when the solenoid assembly is energized, said solenoid assembly including an end face facing said valve spool, said solenoid assembly secured relative to said valve body with said end face spaced a distance from the valve body;
a datum secured to said valve body, said datum comprising a surface of a main body of a solenoid clip; and
a spring biasing said solenoid assembly against said datum, said spring comprising said solenoid clip.

16. The control valve of claim 15, wherein
at least part of said solenoid assembly is interposed between said datum and said valve body.

17. The control valve of claim 15, wherein said valve spool bottoms out on said end face of said solenoid assembly when said solenoid assembly is not energized.

18. A control valve for controlling a transmission, comprising:
a valve body, said valve body defining a chamber in fluid communication with a plurality of fluid ports;
a valve spool positioned in said chamber of said valve body and operable to reciprocate in said chamber to selectively regulate a flow of a working fluid through said fluid ports to control an operation of the transmission;
a solenoid assembly including an armature positioned to actuate said valve spool when said solenoid assembly is energized, said valve spool maintaining a first position when said solenoid assembly is in an unenergized state, said armature moving said valve spool along an actuation direction from said first position to a second position when said solenoid assembly is energized; and
a spring providing a biasing force biasing said solenoid assembly toward a datum, said datum comprising a base of a spring clip, said biasing force acting in a direction opposite to the actuation direction to bias the solenoid assembly against said datum in the direction opposite to the actuation direction, said spring comprising a first resilient arm and a second resilient arm of said spring clip, said first resilient arm and said second resilient arm extending from said base of said spring clip.

19. The control valve of claim 18, wherein said datum is secured to said valve body, at least part of said solenoid assembly interposed between said datum and said valve body.

20. The control valve of claim 18, wherein said solenoid assembly comprises an end face, said valve spool bottoming out on said end face when said solenoid assembly is in said unenergized state.

21. A control valve for controlling a transmission, comprising:
- a valve body, said valve body defining a chamber in fluid communication with a plurality of fluid ports;
- a valve spool positioned in said chamber of said valve body and operable to reciprocate in said chamber to selectively regulate a flow of a working fluid through said fluid ports to control an operation of the transmission; and
- a solenoid assembly including an armature positioned to actuate said valve spool when said solenoid assembly is energized, said solenoid assembly comprising a solenoid head having a distal rim with a notch in fluid communication with the chamber to provide for an exhaust flow out of the chamber of said valve body; and
- a spring clip biasing said solenoid assembly against a datum, said spring clip providing a biasing force to said distal rim of said solenoid head while still allowing said exhaust flow out of the chamber of the valve body through the notch in the distal rim of the solenoid head.

22. The control valve of claim 21, wherein said valve body includes a spring clip access intersecting said solenoid head, said spring clip access sized to receive said spring clip, said spring clip access in fluid communication with said notch to provide for the exhaust flow out of the chamber of said valve body.

23. The control valve of claim 21, wherein said solenoid assembly comprises an end face, said valve spool bottoming out on said end face when said solenoid assembly is not energized, said solenoid assembly secured relative to said valve body with said end face spaced a distance from said valve body.

24. The control valve of claim 21, wherein said spring clip further comprises a first valve body spring arm, said first valve body spring arm biasing said surface of said spring clip defining said datum toward said valve body.

25. The control valve of claim 21, wherein said spring clip comprises a first solenoid spring arm and a second solenoid spring arm, said second solenoid spring arm and said first solenoid spring arm cooperating to bias said solenoid assembly toward said datum.

26. The control valve of claim 25, wherein said spring clip further comprises a first valve body spring arm and a second valve body spring arm, said first valve body spring arm and said second valve body spring arm cooperating to bias said surface of said solenoid clip defining said datum toward said valve body.

27. The control valve of claim 26, wherein said solenoid assembly comprises a solenoid head from which said armature extends when said solenoid is energized, said solenoid head comprising a central shaft spanning a distal solenoid head rim and a proximal solenoid head rim, said first solenoid spring arm and said second solenoid spring arm cooperating to bias said proximal solenoid head rim toward said datum, said central shaft of said solenoid head interposed between said first solenoid spring arm and said second solenoid spring arm, said first solenoid spring arm and said second solenoid spring arm providing a biasing force to said distal solenoid head rim.

28. The control valve of claim 27, wherein said central shaft of said solenoid head is interposed between said first valve body spring arm and said second valve body spring arm, said first valve body spring arm and said second valve body spring arm biasing said solenoid clip relative to said valve body.

29. A control valve for controlling a transmission, comprising:
- a valve body, said valve body defining a chamber in fluid communication with a plurality of fluid ports, said valve body including a spring clip access, said spring clip access being defined between a first surface and a second surface of said valve body, said first and second surfaces both intersecting a longitudinal axis;
- a valve spool positioned in said chamber of said valve body and operable to reciprocate in said chamber to selectively regulate a flow of a working fluid through said fluid ports to control an operation of the transmission, said valve spool comprising a plurality of lands;
- a solenoid assembly including an armature positioned to actuate said valve spool when the solenoid assembly is energized; and
- a spring clip, the spring clip access sized to receive the spring clip compressed between the solenoid and the valve body to index the solenoid assembly relative to the valve body, along said longitudinal axis.

30. The control valve of claim 29, wherein said solenoid assembly comprises a solenoid head positioned in said chamber of said valve body, said solenoid head shaped to allow an exhaust flow of the working fluid to flow from the chamber of the valve body past said solenoid head.

31. The control valve of claim 30, wherein said solenoid head comprises a notch in fluid communication with the chamber of the valve body, the notch allowing the exhaust flow of the working fluid to flow from the chamber of the valve body past said solenoid head.

32. The control valve of claim 29, wherein said spring clip comprises a datum, said spring clip biasing the solenoid assembly toward said datum to index the solenoid assembly relative to the valve body.

33. The control valve of claim 32, wherein said spring clip comprises a first solenoid spring arm biasing said solenoid assembly toward said datum.

34. The control valve of claim 33, wherein said spring clip further comprises a first valve body spring arm and a second valve body spring arm, said first valve body spring arm and said second valve body spring arm cooperating to bias said surface of said spring clip defining said datum toward said valve body, said spring clip further comprising a second solenoid spring arm biasing said solenoid assembly toward said datum.

35. The control valve of claim 34, wherein said solenoid assembly comprises a solenoid head from which said armature extends when said solenoid assembly is energized, said solenoid head comprising a central shaft spanning a distal solenoid head rim and a proximal solenoid head rim, said first solenoid spring arm and said second solenoid spring arm cooperating to bias said proximal solenoid head rim toward said datum, said central shaft of said solenoid head interposed between said first solenoid spring arm and said second solenoid spring arm, said first solenoid spring arm and said second solenoid spring arm providing a biasing force to said distal solenoid head rim.

* * * * *